United States Patent
Lennen (10) Patent No.: US 8,134,502 B2
(45) Date of Patent: Mar. 13, 2012

(54) METHOD AND APPARATUS FOR REDUCING POWER CONSUMPTION IN GNSS RECEIVERS

(75) Inventor: Gary Lennen, Cupertino, CA (US)

(73) Assignee: SIRF Technology, Inc., San Jose, CA (US)

( * ) Notice: Subject to any disclaimer, the term of this patent is extended or adjusted under 35 U.S.C. 154(b) by 466 days.

(21) Appl. No.: 12/540,978

(22) Filed: Aug. 13, 2009

(65) Prior Publication Data

US 2011/0037650 A1    Feb. 17, 2011

(51) Int. Cl.
   *G01S 19/34* (2010.01)
   *G01S 19/24* (2010.01)
(52) U.S. Cl. .............................. 342/357.74; 342/357.63
(58) Field of Classification Search ............ 342/357.63, 342/357.71, 357.74, 357.76; 340/7.32; 455/226.1
   See application file for complete search history.

(56) References Cited

U.S. PATENT DOCUMENTS

| | | | |
|---|---|---|---|
| 5,650,785 A * | 7/1997 | Rodal | 342/357.74 |
| 7,437,132 B2 * | 10/2008 | Hanabusa et al. | 455/130 |
| 2010/0312188 A1 * | 12/2010 | Robertson et al. | 604/156 |

* cited by examiner

*Primary Examiner* — Dao Phan
(74) *Attorney, Agent, or Firm* — Haynes and Boone, LLP (57) ABSTRACT

Systems and methods are disclosed to use adaptive continuous tracking (ACT) to reduce the power consumption of GNSS receivers. In GNSS receivers, a longer observation time of the satellites translates into better positioning accuracy but also consumes more power. ACT allows satellite observation time to be tuned to the desired positioning performance by dynamically adjusting the on time period of the receivers while maintaining a minimum performance metric. The performance metric may be formed from a combination of the estimated position error, the horizontal dilution of precision (HDOP), the data collection state, and the receiver operating environment as characterized by the carrier to noise ratio (CN0). ACT cyclically switches on/off the radio frequency (RF) front-end and also cyclically enables/disables the baseband hardware of the receivers to reduce power consumption while allowing the receivers to meet the minimum performance metric and ensuring continuous satellite tracking, continuous positioning fix operation, multiplexed GNSS operation, and continuous data collection.

21 Claims, 7 Drawing Sheets

Overview of ACT cycle

FIG. 1

Overview of ACT cycle

FIG. 2

Top level of adaptive continuous tracking in a GNSS receiver

FIG. 3

RF front end with RF on/off control

Overview of RF front end and subsystem 1 ACT timing

Overview of subsystem 2 ACT timing

US 8,134,502 B2

METHOD AND APPARATUS FOR REDUCING POWER CONSUMPTION IN GNSS RECEIVERS

TECHNICAL FIELD

The present disclosure relates generally to a method and an apparatus for reducing power consumption in global navigation satellite system (GNSS) receivers. Specifically, the present disclosure relates to a method and an apparatus for using an adaptive continuous tracking (ACT) technique to rapidly switch on/off GNSS receivers to trade off position accuracy for reduced power consumption in GNSS receivers.

BACKGROUND

A global navigation satellite system (GNSS) includes constellations of earth orbiting satellites that constantly transmit orbit information and ranging signals. The dominant GNSS has been the Global Positioning System (GPS) but competing systems such as Glonass, Galileo, Compass, and QZSS exist or are in development. Orbit information and ranging signals transmitted by GNSS satellites are received by GNSS receivers. To determine its position, a GNSS receiver acquires and tracks satellite signals from three or more satellites so as to measure a range from itself to each satellite and also to demodulate the transmitted orbit information. Recently, with the availability of multiple GNSS's, it is desirable to improve the receiver position accuracy and satellite availability of GPS receivers by adding the capability for GPS receivers to receive signals from other GNSS's, such as Glonass. However, adding the capability to receive Glonass signals in GPS receivers increases the power consumption of the receivers. This presents particular challenges for receivers with stringent power constraints, especially in view of the tight power budget imposed by the increasing integration of GPS receivers into handheld devices and other battery-powered applications. Existing techniques for power reduction include minimizing the on-time period of a GNSS receiver and maintaining a more accurate real time clock or a more accurate temperature-compensated crystal oscillator (TCXO) to allow more rapid acquisition of satellite signals when the receiver enters the on-time period. However, these techniques tend to reduce power consumption without maintaining an acceptable position fixing accuracy. Other techniques such as running a receiver at a periodic duty cycle may not maintain sufficient signal tracking to yield significant power savings when the receiver upon wakeup has to expend energy for the tracking loops to pull in satellite signals that are no longer in track. Therefore, it is desirable to find a more flexible technique to reduce power consumption in GNSS receivers while allowing the receivers to take advantage of the increased availability of satellite signals from multiple GNSS's to maintain a minimum performance metric.

BRIEF SUMMARY

Systems and methods are disclosed herein to use what is referred to as adaptive continuous tracking (ACT) to reduce the power consumption of GNSS receivers. In GNSS receivers, performance as measured by position accuracy is a function of the observation time of the satellites. For example, the level of accumulated signal energy used for tracking the satellite signal, for obtaining range measurements, and for demodulating the transmitted data is proportional to the length of the observation time of a given satellite. A longer observation time translates into more reliable range measurements and demodulated data, and ultimately into better positioning accuracy. However, a longer observation time also means more power consumption. ACT allows satellite observation time to be tuned to the desired positioning performance by dynamically adjusting the on-time period of the receivers while maintaining a minimum performance metric. The performance metric may be formed from a combination of the estimated position error, the horizontal dilution of precision (HDOP), the data collection state, and the receiver operating environment as characterized by the carrier-to-noise ratio (CN0). ACT cyclically switches on/off the radio frequency (RF) front-end and also cyclically enables/disables the baseband hardware of the receivers to reduce power consumption while allowing the receivers to meet the minimum performance metric and ensuring continuous satellite tracking, continuous positioning fix operation, multiplexed GNSS operation, and continuous data collection.

In accordance with one or more embodiments of the present disclosure, an ACT system for a satellite-based navigation receiver includes an ACT on/off control module used to adjust the observation time of tracked satellite signals for at least one GNSS in response to performance measurements where the observation time is adjusted lower if the performance measurements are above minimum performance metrics, and the observation time is adjusted higher if the performance measurements fall below the minimum performance metrics. A RF front end adjusts the duty cycle of an on/off period of the RF front end in response to the adjusted observation time to generate corresponding on-time samples from the tracked satellites. A baseband processing module also adjusts the duty cycle of an on/off period of the baseband processing module in response to the adjusted observation time to process the on-time samples from the RF front end to generate range measurements to the tracked satellites.

In accordance with one or more embodiments of the present disclosure, a method for reducing power consumption of a satellite-based navigation receiver includes determining minimum performance metrics of the receiver, monitoring performance measurements of the receiver, adjusting periodically an observation time of satellite signals for at least one GNSS in response to the performance measurements where the observation time is adjusted lower if the performance measurements are above the minimum performance metrics, and the observation time is adjusted higher if the performance measurements fall below the minimum performance metrics, adjusting the duty cycle of an on/off period of the receiver in response to the adjusted observation time to generate a navigation solution, and updating the performance measurements of the receiver.

These and other embodiments of the present disclosure will be more fully understood by reference to the following detailed description when considered in conjunction with the following drawings.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Systems and methods are disclosed for using ACT to rapidly switch on/off the RF front-end and the baseband hardware of the GNSS receivers to reduce power consumption as a function of the desired performance metrics. ACT may be used when 1 Hz positioning fix operation is required and the receivers are operating in environments where the received CN0 of the satellites and the number of satellites needed in the navigation solution are more than the minimum. ACT adapts satellite observation time to the operating environment through rapidly switching on/off the RF front end and rapidly enabling/disabling the digital baseband processing to reduce power consumption while attempting to maintain the desired performance metrics. The desired performance metrics may be formed from a combination of the maximum position error allowed, the maximum HDOP allowed, requirements for data demodulation, the minimum satellite set, and the minimum CN0. ACT tunes the observation time such that the estimated position error and the HDOP as reported by the navigation solution and the measured carrier to noise ratio (CN0) of each satellite satisfy the desired performance metrics.

ACT allows the GNSS receivers to maintain continuous tracking of satellites to respond to dynamic signal condition. ACT also allows the GNSS receivers to continue to obtain position fix at 1 Hz, to demodulate the 50 baud data, and to perform carrier phase tracking of satellites for integrated Doppler measurements. When a large number of satellites from GPS/Glonass are observable, ACT affords GNSS receivers the flexibility to perform further trade-off of power against performance by reducing the satellite observation time for satellites that have higher CN0 and improved DOP. Even though effective CN0 is reduced by the reduced satellite observation time, there is no degradation in performance cause by multipath error, which is the dominant error source in many operating environments. To further reduce power consumption, ACT may also operate in a non-coherent sub-mode by switching off the synthesizer or the VCO in the RF front-end such that the carrier phase is not maintained across the RF off time. Because carrier phase integrity is not maintained between the RF on periods, there is no data demodulation in the non-coherent sub-mode. However, the non-coherent sub-mode provides an option to operate at even lower power when no 50 baud data decoding is required.

In addition, the RF front-end may be shared between the GPS and Glonass to allow the receiver to rapidly switch between the two GNSS's to effect further power reduction. RF front-end switching between GPS and Glonass may operate in place of the ACT. Alternatively, RF front-end GPS/Glonass switching may operate in conjunction with ACT so that the observation time of GPS and Glonass may each be tuned individually to meet the desired performance metrics.

Figure 1:
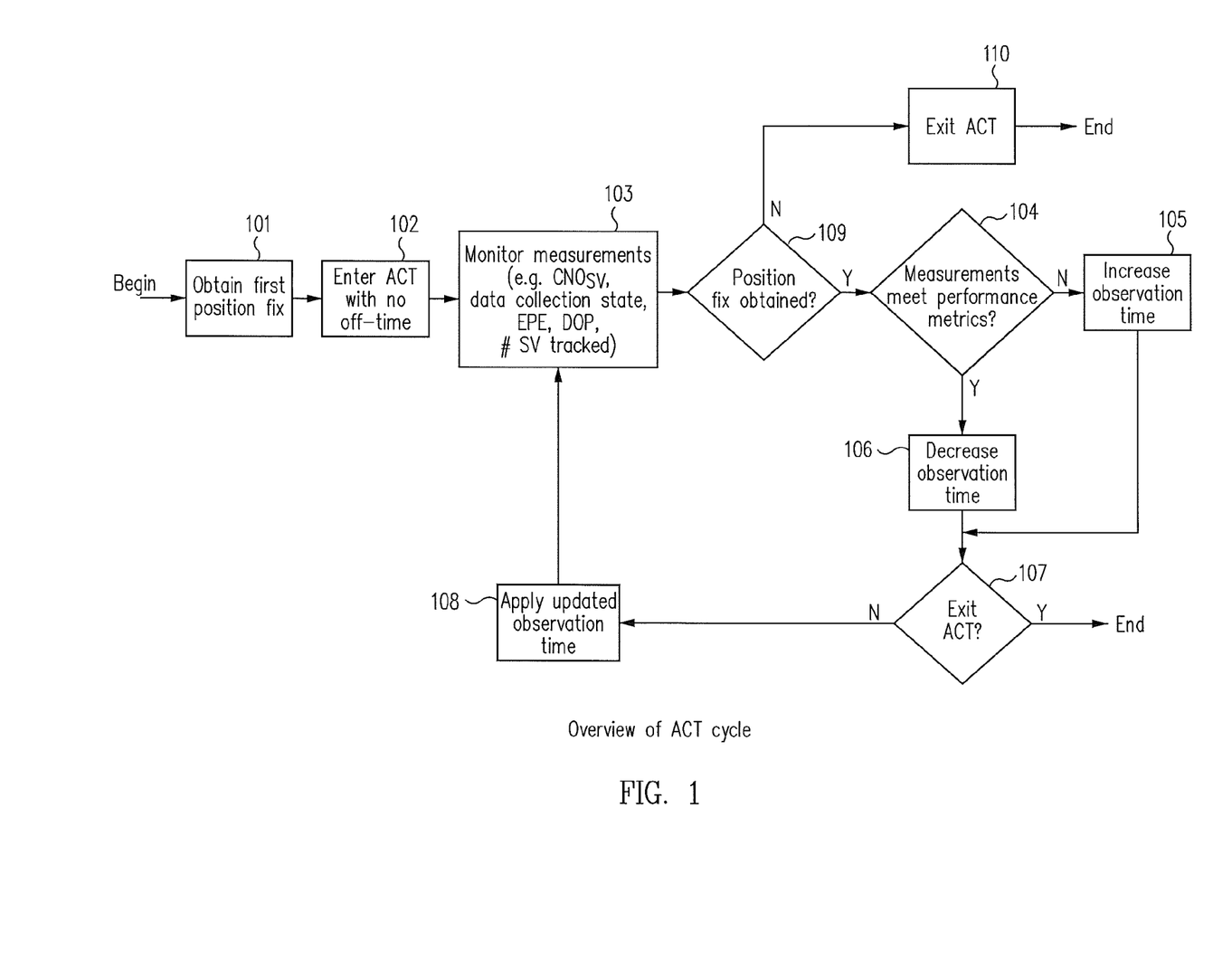
FIG. 1 shows the use of ACT to adjust the observation time of satellites according to one or more embodiments of the present invention.

FIG. 1 shows the use of ACT to adjust the observation time of satellites according to one or more embodiments of the present invention. ACT mode is intended for continuous positioning mode and the receiver may enter ACT mode after signals from at least three satellites have been acquired and a position fix is obtained in 101. During the transition period in 102, the receiver may run an ACT mode without any off period for a few seconds as the receiver assesses the operating environments. To assess the operating environments, the receiver may monitor performance measurements of the receiver, such as the CN0 of the three or four satellites whose acquired signals were used for the initial position fix, the status of data collection, the DOP (dilution of precision), and the EPE (estimated position error) in step 103. The receiver may monitor the measurements periodically. At the same periodic rate, the receiver may check to see if the navigation solution can obtain a position fix in step 109. If there is no position fix in the last measurement period, the receiver may exit the ACT mode in step 110 to reacquire the satellites. Otherwise, the performance measurements are evaluated in step 104 to determine if they meet the performance metrics which may be a function of the minimum CN0, requirements for data demodulation, the minimum satellite set, the maximum DOP, and the maximum EPE. If the performance measurements meet the performance metrics, the satellite observation time may be decreased in step 106 to trade off performance for a reduction in power. Otherwise, the satellite observation time may be increased in step 105 to try to improve performance at a cost of increased power. In step 107, the receiver may check to see whether to continue with the next ACT cycle. If so, the receiver applies the new observation time in step 108, runs the receiver for an ACT cycle, and monitors a new set of performance measurements for evaluation against the performance metrics to determine how to adjust the observation time for the next ACT cycle. The ACT cycle may run at 1 Hz to adjust the observation time once a second. The ACT decision may include some dB of CN0 margin and may also include a hysteresis so the ACT may monitor performance measurements for a few cycles before deciding to decrease the observation time. On the other hand, when the performance measurements start to degrade, the ACT may increase the observation time immediately on the next cycle.

Figure 2:
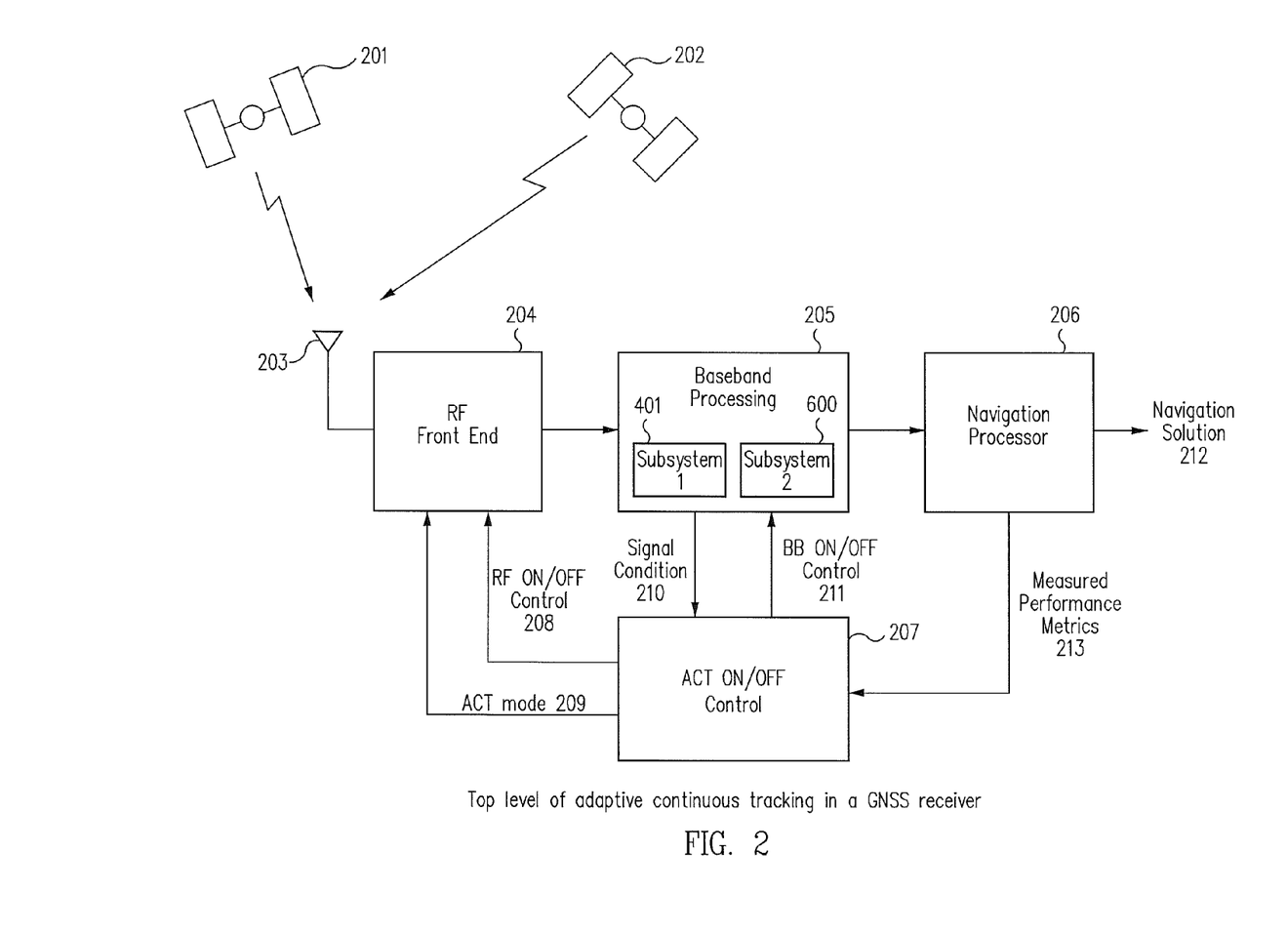
FIG. 2 shows a top level block diagram of a GNSS receiver running ACT to receive signals from GPS/Glonass satellites according to one or more embodiments of the present disclosure.

FIG. 2 shows a top level block diagram of a GNSS receiver running ACT to receive signals from GPS/Glonass satellites according to one or more embodiments of the present disclosure. Satellite signals from a GPS satellite 201 and a Glonass satellite 202 are received by the antenna 203 of a GNSS receiver. The received signal may be filtered, amplified, down-converted, sampled and digitized by the RF front end 204. Control signals for operating RF front-end 204 in ACT comes from the ACT on/off control module 207. One control signal, the RF on/off control signal 208, powers on and off the RF front-end 204 to control the satellite observation time. Another control signal, the ACT mode signal 209, commands RF front-end 204 to be either in the coherent sub-mode, where the carrier phase is maintained across the RF down time, or in the non-coherent sub-mode, where the carrier phase is not maintained across the RF down time. In addition, the ACT mode signal 209 may switch the RF front-end between receiving GPS or Glonass satellite signals.

Digitized satellite signal from RF front-end 204 is processed by the baseband processing module 205. Baseband processing module 205 acquires and tracks the digitized satellite signals to measure the pseudo-range from the GNSS receiver to the satellites and to demodulate the 50 baud satellite data containing satellite orbital information. In one or more embodiments of the present invention, the baseband processing module 205 may include a subsystem 1 signal processing module 401 and a subsystem 2 signal processing module 600. The subsystem 1 signal processing module 401 may perform filtering and interference cancellation on the baseband signal. The subsystem 2 signal processing module 600 may remove the Doppler frequency from the baseband signal, generate the local PN (pseudorandom noise) code, correlate the local PN code with the baseband signal in matched filters, perform coherent integration on the matched filter output, demodulate data, and run tracking loops to track the signal. The tracking loops may also update at the 50 Hz rate to match the 50 baud rate of the data. Control signals for operating baseband processing module 205 in ACT also come from the ACT on/off control module 207 through the BB on/off control signal 211. The BB on/off control signal 211 is used to enable/disable baseband processing in synchronization with the RF on/off control 208 so that the baseband processing module 205 only operates on digitized satellite signal captured when the RF front-end 204 is switched on. Therefore, the timing of the BB on/off control signal 211 is similar to that of the RF on/off control signal 208 where the BB on/off control signal 211 enables the baseband processing module 205 with some delay after the RF on/off control signal 208 powers on the RF front-end 204 at the start of the on time period. The time delay is designed to account for the propagation delay of the signal through the receiving chain of the RF front-end 204 and to allow time for the synthesizer or the VCO to stabilize when ACT operates RF front-end 204 in the non-coherent sub-mode. On the other hand, at the end of the on time period, the baseband processing module 205 may be disabled at the same time that the RF front-end 204 is powered down.

In one embodiment of the coherent sub-mode, the BB on/off control signal 211 has an on/off period of 20 ms to match the data bit length of both GPS and Glonass. The ACT on/off control module 207 may adjust the on time of the BB on/off control signal 211 to be between 1 and 10 ms in 1 ms increment. Conversely, the off time of the BB on/off control signal 211 may be between 19 to 10 ms. With the on/off period of 20 ms, each on/off period will observe some satellite energy from each data bit so that data demodulation may be maintained. The code and carrier tracking loops may also update every 20 ms. Therefore, in coherent sub-mode every tracking loop will also observe some satellite energy. On the other hand, in the non-coherent sub-mode, the off time is fixed at 20 ms and the on time may be varied from 1 to 20 ms. The 20 ms off time eliminates the possibility of a coherent integration period straddling an off time and causing a cancellation of the coherent integration when the carrier phase is 180° out of phase between the on times of the coherent integration period. This means that the tracking loops will not observe satellite energy every 20 ms and that there is no data demodulation when the ACT is operating in the non-coherent sub-mode.

The Baseband processing module 205 also generates signal condition 210 for use by the ACT on/off control module 207 to adapt the satellite observation time to the operating conditions. The signal condition signal 210 may indicate the measured CN0 of each satellite or the number of satellites being tracked so that the ACT on/off control module 207 may adjust the RF on/off control signal 208 and the BB on/off control signal 211 to meet the minimum performance metrics. In addition to the signal condition signal 210, the baseband processing module 205 also outputs the range measurements and the demodulated satellite data to the navigation processor 206.

The navigation processor 206 uses the range measurements and demodulated data from the baseband processing module 205 to generate the navigation solution 212 at the 1 Hz rate. The navigation processor 205 also generates the measured performance metrics 213 for use by the ACT on/off control module 207 to adapt the satellite observation time so as to meet the desired minimum performance metrics. The measured performance metrics 213 may include the estimated position error and the HDOP as derived from the navigation solution. In the coherent sub-mode, processing of the navigation processor 206 does not change as a function of the on time of the RF on/off control signal 208 or the BB on/off control signal 211. Similarly, even though the effective CN0 is reduced by reducing the on time of the ACT on/off cycle, the navigation processor 206 generates the navigation solution 212 at the 1 Hz rate to maintain continuous position fixing.

As mentioned, the ACT on/off control module 207 receives the estimated position error and the HDOP as reported by the navigation processor 206, and the measured carrier to noise ratio (CN0) of each satellite and the number of satellites from the baseband processing module 205. It then adjusts the satellite observation time in response to these measurements to satisfy the minimum performance metrics. The minimum performance metrics may be formed from the maximum position error allowed, the maximum HDOP allowed, the requirements for data demodulation, the minimum satellite set, and the minimum CN0.

ACT on/off control module 207 may also multiplex the RF front end 204 between GPS and Glonass satellite signals to take advantage of the availability of more than one GNSS to effect further reduction in power. For example, adjusting the GPS/Glonass multiplexing in favor of observing satellites from the GNSS that has better CN0 may allow the ACT to reduce satellite observation time without affecting receiver performance. The ACT mode signal 209 may switch the RF front end 204 between receiving GPS and Glonass satellite signals with the same timing as the on/off switching timing of a RF front end 204 receiving only GPS signals in the coherent sub-mode. Thus, the GPS/Glonass switching period may be set to 20 ms so that satellite energies from each data bit of both GNSS's will be observed and the RF front end 204 will observe either GPS or Glonass satellite signals. Observation time for Glonass may be adjusted to be between 1 and 10 ms in 1 ms increment. Conversely, observation time for GPS may be between 19 to 10 ms. Alternatively, each of the GPS and Glonass observation time may have its own on/off cycle time so that the GPS/Glonass switching of the ACT mode signal 209 works in conjunction with the on/off switching of the RF on/off control 208 to reduce receiver power while maintaining the minimum performance metrics.

Figure 3:
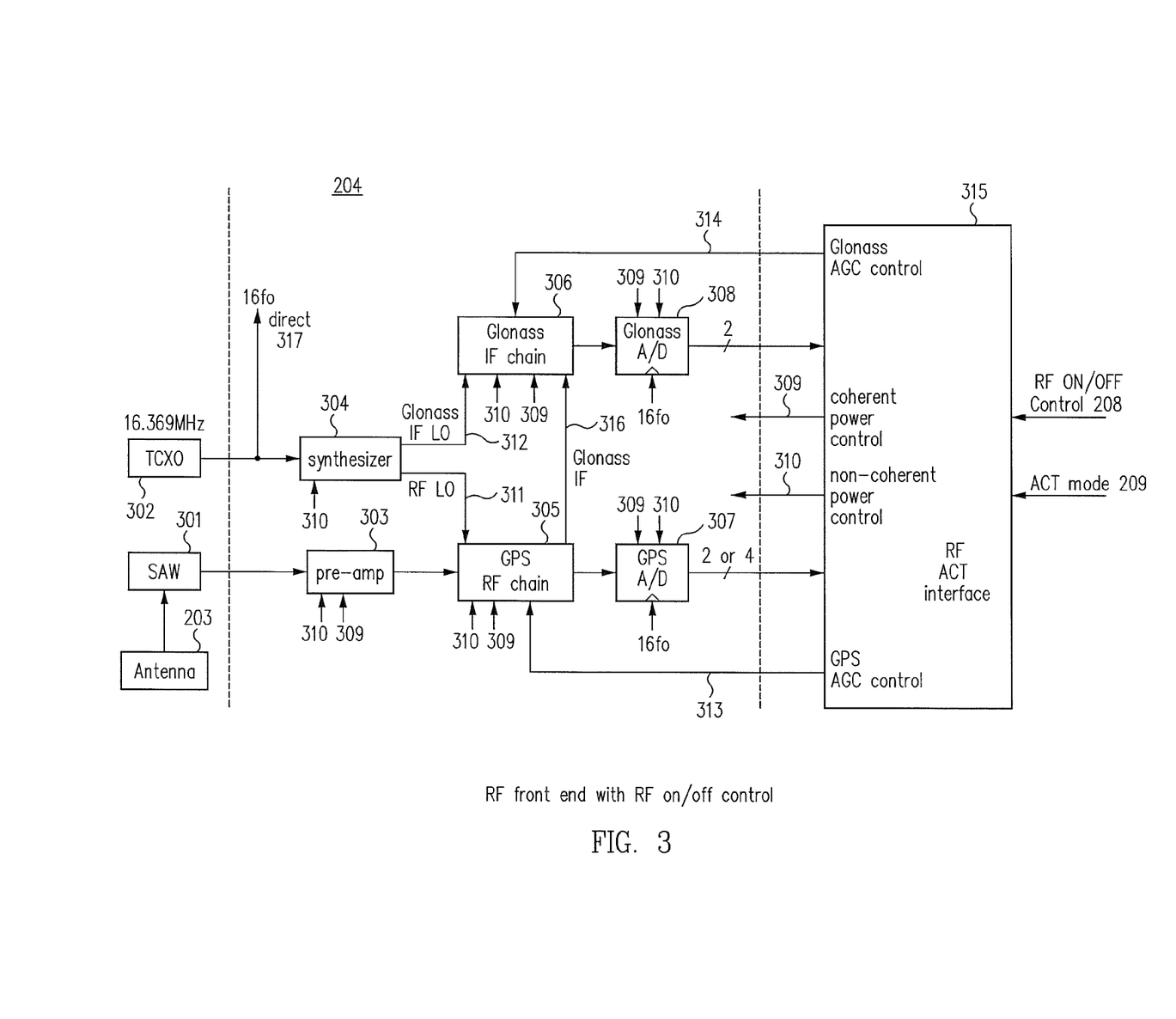
FIG. 3 shows the use of ACT to control the RF front end of a GNSS receiver according to one or more embodiments of the present disclosure.

FIG. 3 shows the use of ACT to control the RF front end 204 of a GNSS receiver according to one or more embodiments of the present disclosure. Satellite signal received by the antenna 203 is filtered by the SAW filter 301, low-noise amplified by the pre-amp 303, and then received by the GPS RF chain module 305. The GPS RF chain module 305 has mixers and filters to down-convert the received signal from RF to IF or baseband by mixing the received signal with RF LO (local oscillator) 311 received from the synthesizer 304. The synthesizer 304 has the LO generation function that takes as its input a reference clock from the output of the TCXO (thermally controlled crystal oscillator) 302. In one embodiment of the RF front end 204, the GPS RF chain module 305 may down-convert the GPS satellite signal to baseband for sampling by the GPS A/D 307. For Glonass satellite signal, the GPS RF chain module 305 may down-convert the Glonass satellite signal first to a Glonass IF (intermediate frequency) 316, which may then be down-converted by the Glonass IF chain module 306 to baseband for sampling by the Glonass A/D 308. The Glonass IF chain module 306 may use as its LO the Glonass IF LO 312 generated also by the synthesizer 304. In other embodiments, the GPS RF chain module 305 may also directly down-convert the Glonass satellite signal to baseband using the Glonass IF LO 312. In still other embodiments, the GPS A/D 307 and the Glonass A/D 308 may be combined into a single A/D. Sampled and digitized signals from the GPS A/D 307 and the Glonass A/D 308 are received by the baseband processing module 205.

The RF ACT interface module 315 receives the RF on/off control signal 208 and the ACT mode 209 signals from the ACT on/off control module 207 to generate the control signals to switch on and off the various components of the RF front end 204 when the receiver is in ACT mode. In the off time of the ACT cycle of the coherent sub-mode where the carrier phase must be maintained, the pre-amp 303, the GPS RF chain module 305, the Glonass IF chain module 306, the GPS ND 307, and the Glonass A/D 308 are powered down by the coherent power control 309 from the RF ACT interface module 315. The TCXO 302, synthesizer 304, and the LO generation functions remain powered on to ensure that the carrier phase is maintained across off time. In addition, the Glonass IF chain module 306 and the Glonass A/D 308 may be powered down independently and separately from any ACT function. For example, when observing GPS satellite signals, the Glonass IF chain module 306 and the Glonass A/D 308 may be powered down. When observing Glonass satellite signals, the GPS A/D 307 may be powered down. When not observing either GPS or Glonass satellite signal, as in the off time, the pre-amp 303, the GPS RF chain module 305, the Glonass IF chain module 306, the GPS A/D 307, and the Glonass A/D 308 are all powered down.

In the non-coherent sub-mode during the off-time of the ACT cycle, the pre-amp 303, the GPS RF chain module 305, the Glonass IF chain module 306, the GPS A/D 307, and the Glonass A/D 308 are similarly powered down by the non-coherent power control 310 from the RF ACT interface module 315 as in the coherent sub-mode. In addition, the synthesizer 304 and the LO generation function are powered down by the non-coherent power control 310 since the carrier phase is not required to be maintained during the off time of the ACT cycle. This leads to an undefined carrier phase when the synthesizer 304 and the LO generation function return to the on state. This may also lead to a potential cancellation of coherent integrations if the 20 ms coherent integration interval straddles both sides of the off time when the carrier phase flips 180°. It is for this reason that the off time for the non-coherent sub-mode is set to 20 ms. During the off time, the $16f0_{direct}$ clock 317 from the TCXO 302 may directly drive the receiver clock. During the off time, the GPS AGC control 313 and the Glonass AGC control 314 may also command the GPS RF chain 305 and the Glonass IF chain 306, respectively, to disable the AGC function.

Figure 4:
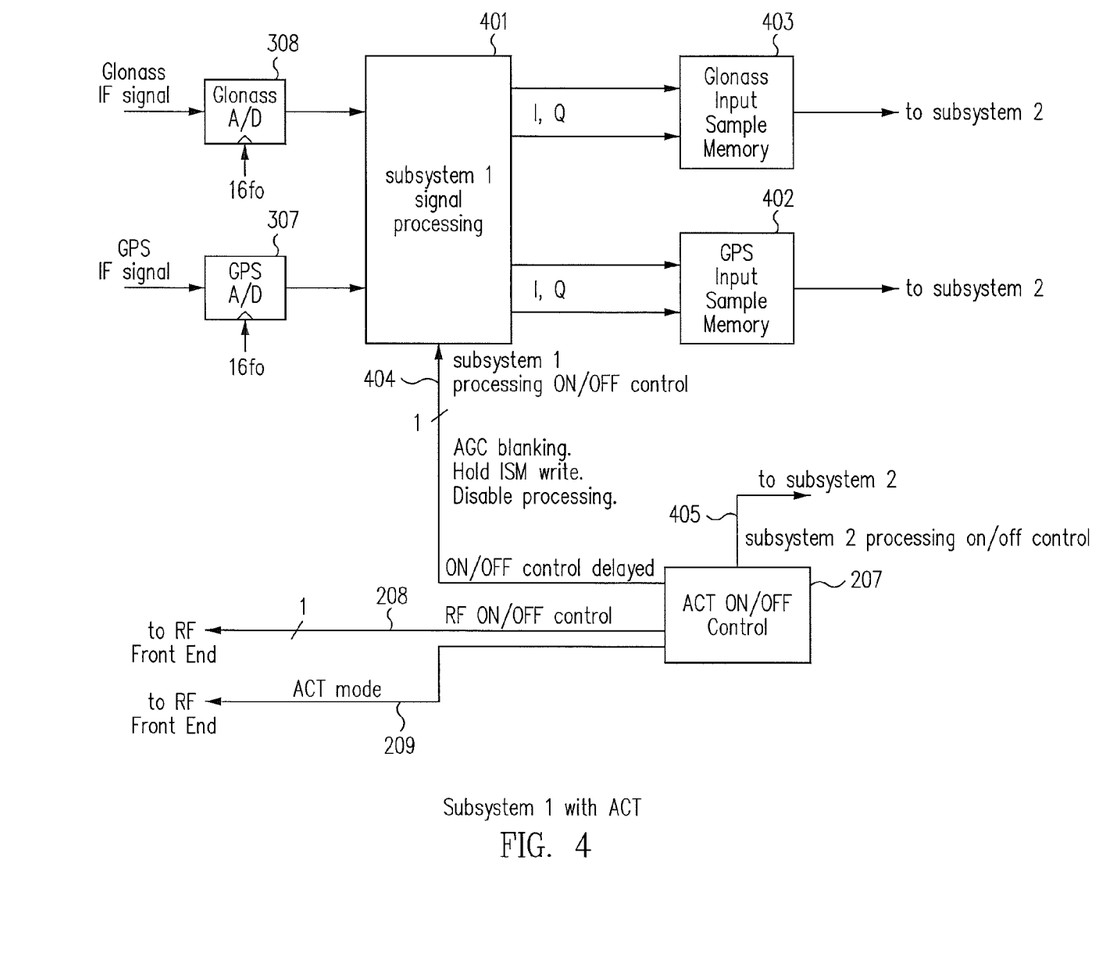
FIG. 4 shows the use of ACT control signals to control the subsystem 1 signal processing module and the input sample memory of the baseband processing module of a GNSS receiver according to one or more embodiments of the present disclosure.

FIG. 4 shows the use of ACT control signals to control the subsystem 1 signal processing module 401 and the input sample memory of the baseband processing module 205 of a GNSS receiver according to one or more embodiments of the present disclosure. The GPS signal and the Glonass signal are sampled and digitized by the GPS A/D 307 and the Glonass A/D 308, respectively. The digitized signals are processed by the subsystem 1 signal processing module 401. The subsystem 1 signal processing module 401 may perform further down-conversion of the digitized signal to baseband if the signal from the RF front-end 204 is in IF. In addition, the subsystem 1 signal processing module 401 may perform digital filtering to shape the signal waveform and to remove interference signals. Outputs from the subsystem 1 signal processing module 401 may be stored into the Glonass input sample memory 403 or the GPS input sample memory 402 for subsequent processing by the matched filter. The ACT on/off control module 207 generates the RF on/off control signal 208 for the RF front end 204, the subsystem 1 processing on/off control signal 404 to enable/disable the subsystem 1 signal processing module 401, and the subsystem 2 processing on/off control signal 405 to enable/disable the subsystem 2 signal processing module 600 of the baseband processing module 205. The subsystem 1 processing on/off control signal 404 and the subsystem 2 processing on/off control signal 405 may be part of the BB on/off control signal 211 of FIG. 1. The subsystem 1 processing on/off control signal 404 enables AGC blanking, holds writes into the input sample memories 402, 403, and disables the subsystem 1 signal processing module 401 when the RF front end 204 is switched off. Similarly, the subsystem 2 processing on/off control signal 405 disables the matched filter and the coherent integration of the subsystem 2 signal processing module 600 when the subsystem 1 signal processing module 401 is disabled.

Figure 5:
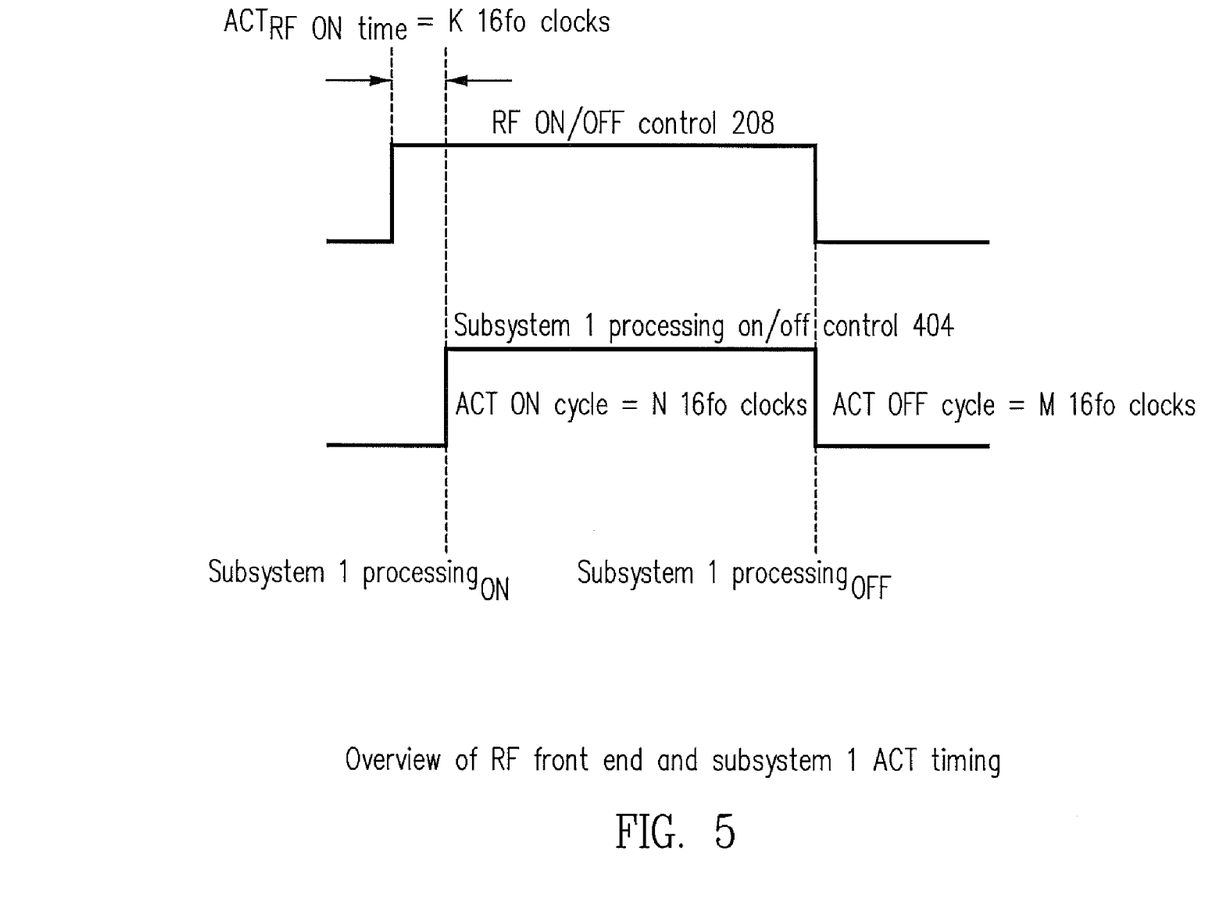
FIG. 5 shows the relationship between the on/off switching time of the RF on/off control signal and of the subsystem 1 processing on/off control signal according to one or more embodiments of the present invention.

FIG. 5 shows the relationship between the on/off switching time of the RF on/off control signal 208 and of the subsystem 1 processing on/off control signal 404 according to one or more embodiments of the present invention. The on time of the subsystem 1 processing on/off control signal 404 is delayed with respect to the on time of the RF on/off control signal 208 to account for the signal path delay through the receiving chain of the RF front end 204. In addition, this on time delay may account for the time it takes for the synthesizer 304 and the LO generation function to stabilize in the non-coherent sub-mode when switching from the off time to the on time. The ACT on/off control module 207 may program the on-time delay to be K cycles of a basic baseband clock.

As mentioned, the ACT on/off control module 207 also adjusts the satellite observation time in response to the measured performance metrics to satisfy the minimum performance metrics. Thus, the ACT on/off control module 207 may program the on period for the subsystem 1 processing on/off control signal 404 to N clocks to correspond to one of the supported on time selection in ms when operating ACT in the coherent or the non-coherent sub-modes. Similarly, the off time for the subsystem 1 processing on/off control signal 404 may be programmed to M clocks to correspond to one of the supported off time in ms in the coherent or the non-coherent sub-modes. The ACT on/off control module 207 may adjust N and M at the 1 Hz update rate of the satellite observation time. Even though the RF front end 204 is turned on K clocks before the baseband processing module 205, the off time of the subsystem 1 processing on/off control signal 404 and the off time of the RF on/off control signal 208 may coincide to disable the baseband processing module 205 and to turn off the RF front end 204 simultaneously.

Figure 6:
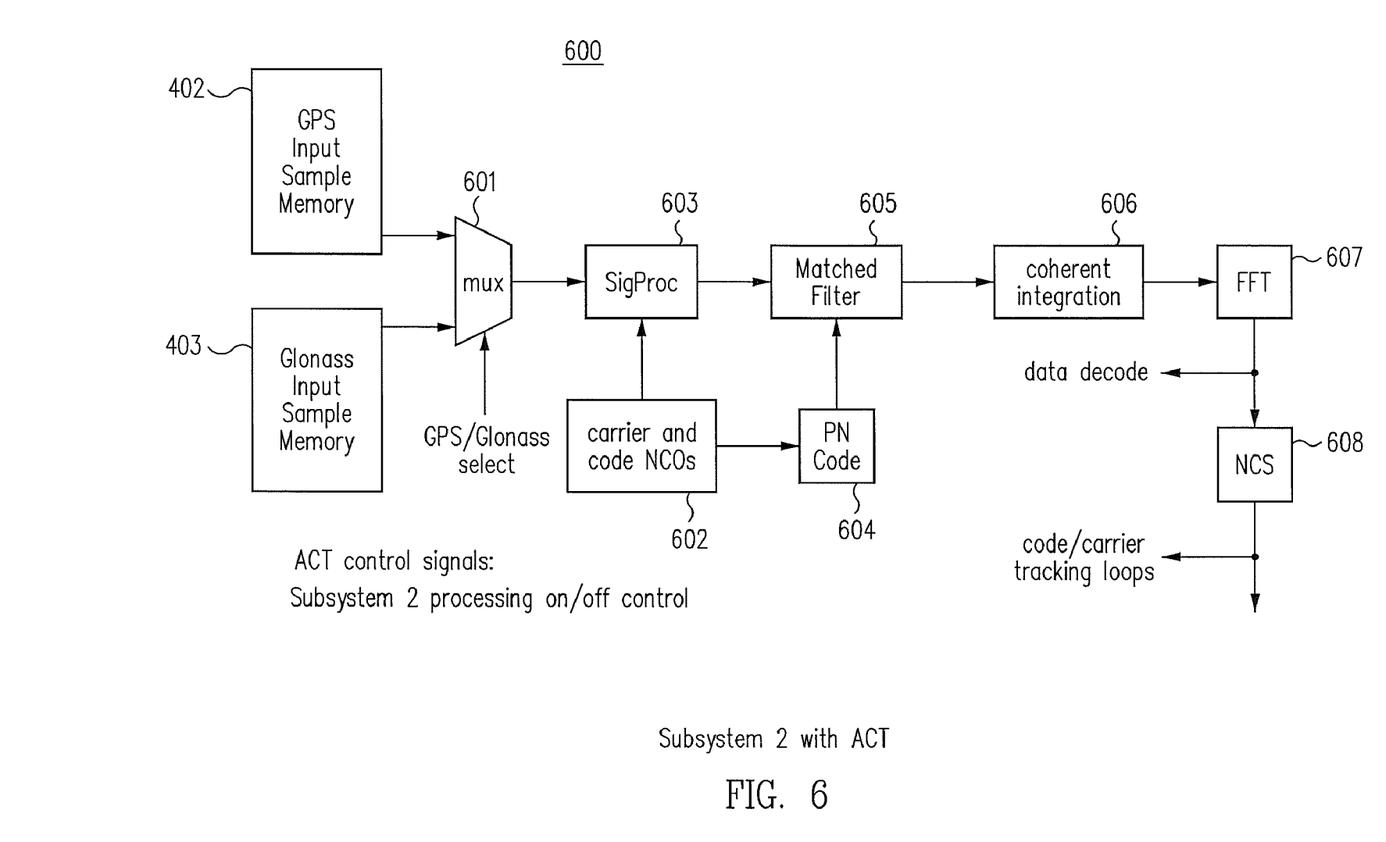
FIG. 6 shows the use of ACT control signals to control the subsystem 2 signal processing module of the baseband processing module of a GNSS receiver according to one or more embodiments of the present invention.

FIG. 6 shows the use of ACT control signals to control the subsystem 2 signal processing module 600 of the baseband processing module 205 of a GNSS receiver according to one or more embodiments of the present invention. GPS and Glonass signals processed by subsystem 1 are written into the GPS input sample memory 402 or the Glonass input sample memory 403 and read out for processing by subsystem 2 for each channel of satellite data. The mux 601 selects between the GPS or the Glonass for processing. Carrier and code NCOs 602 generates a carrier Doppler frequency for use by the SigProc module 603 to remove the carrier Doppler frequency from the signal. In addition, carrier and code NCOs 602 also generates a code Doppler frequency for use by the PN code 604 to generate local replicas of the GPS C/A code for use by the matched filter 605. For Glonass processing, the carrier and code NCOs 602 may also generate a code Doppler frequency for use by the PN code 604 to generate local replicas of the Glonass PN code. Because ACT is intended for continuous positioning fix, time uncertainty within a PN chip and frequency uncertainty within a few Hz may be assumed. Therefore, the matched filter 605 may only contain 16¼ chip spaced correlators. The correlators of the matched filter 605 correlate the received signal with the local replicas of the PN code 604. Correlator outputs from the matched filter 605 may be coherently integrated in coherent integration 606 to accumulate the correlation energies. A FFT 607 (Fast Fourier Transform) may be run on the coherent integration output to detect any residual Doppler frequency on the signal. The coherent integration output may also be non-coherently extended by NCS 608 (Non-Coherent Sum) to generate a non-coherent integration output. In addition, code and carrier tracking loops may run on the coherent integration output and the non-coherent integration output to generate the tracking errors for updating the carrier and code NCOs 602 so as to track the satellite signal.

The subsystem 2 processing on/off control signal 405 generated by the ACT on/off control module 207 is used to enable/disable the subsystem 2 signal processing module 600 in ACT. During the off period, data is not read out of the GPS input sample memory 402 or the Glonass input sample memory 403, matched filter 605 is disabled, and coherent integration 606 does not coherently accumulate the matched filter 605 output. SigProc 603, carrier and code NCOs 602, and PN code 604 may also be disabled. However, carrier and NCOs 602 need to be propagated across the off time to ensure that they have the correct NCO values when the subsystem 2 is enabled again. Therefore, it may be easier to keep the carrier and NCOs 602 enabled all the time.

After the subsystem 1 signal processing module 401 has written sufficient satellite signal samples into the GPS/Glonass input sample memories 402, 403 during the on time of the subsystem 1 signal processing module 401, subsystem 2 processing on/off control signal 405 may be turned on to start reading out the stored data for processing. Subsystem 2 processing on/off control signal 405 may remain on until all the data samples observed during the on time by the RF front end 204 and processed by the subsystem 1 signal processing module 401 are read out. There are two different ways that the data samples in the GPS/Glonass input sample memory 402, 403 may be read out for processing. The two ways are referred to as the channel time and the user time operations and differ in how the satellite data is aligned with the local replica of the PN code 604 for correlation between the two in the matched filter 605. Implementation of ACT control for the channel time and user time operations may also differ.

Channel time operation is characterized by moving the sample timing for the satellite signal to achieve alignment between the satellite signal and the local PN code 604 in the matched filter 605. The code phase of the local PN code 604 is kept at the same fixed timing for all satellite channels and does not get updated by the carrier and code NCOs 602. Because the alignment between the signal and the local PN code 604 is different for each satellite channel, the read timing and read address from the input sample memory 402, 403 is varied for each satellite channel. The variable read timing and read address are generated by a code phase register of the carrier and code NCOs 602. To process all the on-time samples in the input sample memory relative to the fixed local PN code 604, the matched filter may have to process some off-time samples. This means that the on time of the subsystem 2 processing on/off control signal 405 may be wider than the on time of the subsystem 1 processing on/off control signal 404. The difference in the on time between subsystems 1 and 2 is based on the time resolution of the matched filter 605. For example, if the matched filter 605 has a time resolution of ¼ ms, then successive segments of local PN code 604 are loaded into the matched filter 605 offset by ¼ ms in code phase from one another. The matched filter 605 may also have to read in up to ¼ ms of off time samples to align the satellite signal and the local PN code 604. Therefore, the subsystem 2 processing on/off control signal 405 may have to turn on ¼ ms before the subsystem 1 processing on/off control signal 404. By the same token, the subsystem 2 processing on/off control signal 405 may have to turn off ¼ ms after the subsystem 1 processing on/off control signal 404. The subsystem 2 processing on/off control signal 405 may have different on and off timing for different satellite channels. Also, even though the off-time samples processed by the matched filter 605 are effectively nulled from a coherent integration perspective, the wider on time of the subsystem 2 processing on/off control signal 405 may reduce the power saving realizable from ACT.

In contrast, user time operation is characterized by moving the timing for the local PN code to achieve alignment between the satellite signal and the local PN code 604 in the matched filter 605. The read timing and read address from the input sample memory 402, 403 are fixed for each satellite channel. The code phase register of the carrier and code NCO 602 is used to vary the code phase of the local PN code 604 loaded into the matched filter 605 for each satellite channel. Because the satellite samples are read with the same timing and from the same address of the input sample memory 402, 403 for each channel, it is straightforward to synchronize the operation of the matched filter 605 to operate only on the on-time signal samples in the user time operation. Therefore, the subsystem 2 processing on/off control signal 405 may have the same on and off timing for all the satellite channels.

Figure 7:
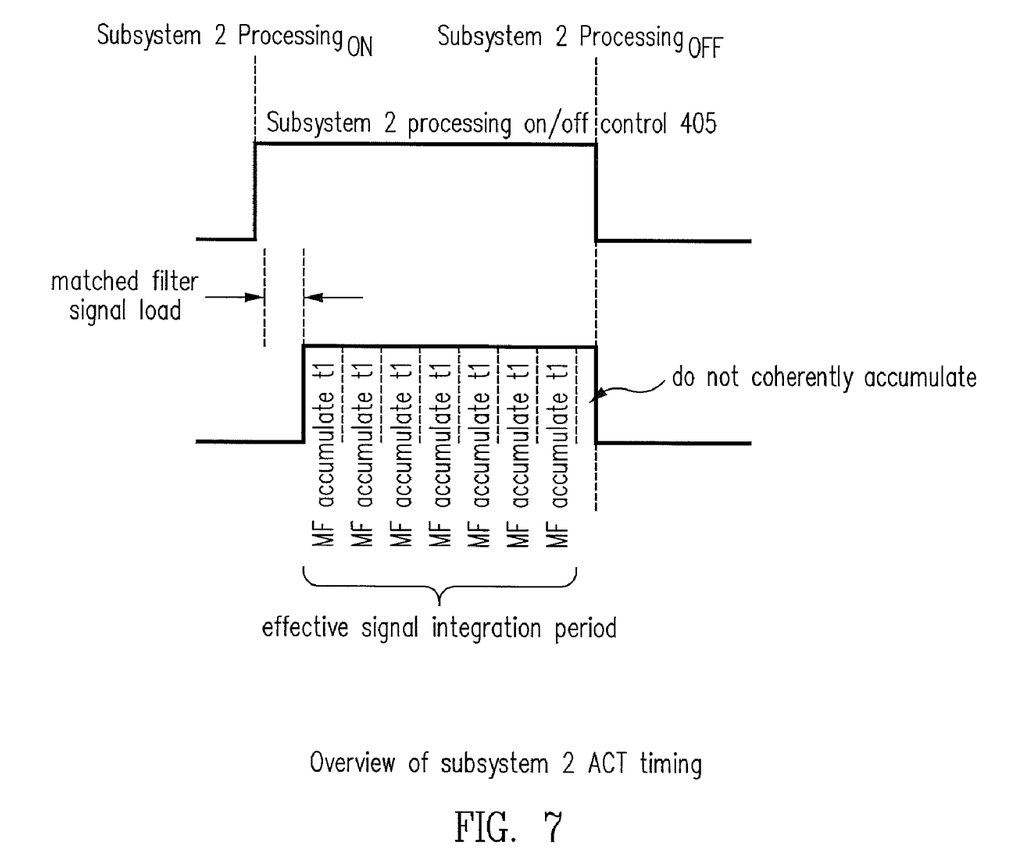
FIG. 7 shows the relationship between the on/off switching time of the subsystem 2 processing on/off control signal, the matched filter operation, and the coherent integration timing according to one or more embodiments of the present invention.

FIG. 7 shows the relationship between the on/off switching time of the subsystem 2 processing on/off control signal 405, the matched filter 605 operation, and the coherent integration 606 timing according to one or more embodiments of the present invention. After a sufficient number of processed signal samples from the subsystem 1 signal processing module 401 has been written to the GPS/Glonass input sample memory 402, 403, the subsystem 2 processing on/off control signal 405 is turned on to enable read from the input sample memory 402, 403 for each channel of satellite data. The subsystem 2 processing on/off control signal 405 may just be a delayed version of the subsystem 1 processing on/off control signal 404. After waiting for some time for the signal samples to be processed by the sigProc 603 and to be loaded into the matched filter 605, the matched filter 605 starts the correlation and the coherent integration 606 starts to accumulate the correlation energies between the signal and the local PN code. Correlation and coherent integration continue until the subsystem 2 processing on/off control signal 405 turns off to indicate the end of on-time samples read from the input sample memory 402, 403. Because the end of on-time samples may fall anywhere within the time resolution boundary of the matched filter 605, the coherent integration 606 may be commanded to terminate the accumulation at the start of the time resolution boundary in which the subsystem 2 processing on/off control signal 405 turns off. Therefore, the time resolution of coherent integration 606 may be same as the time resolution of the matched filter 605.

Although embodiments of the present disclosure have been described, these embodiments illustrate but do not limit the disclosure. It should also be understood that embodiments of the present disclosure should not be limited to these embodiments but that numerous modifications and variations may be made by one of ordinary skill in the art in accordance with the principles of the present disclosure and be included within the spirit and scope of the present disclosure as hereinafter claimed.

I claim:

1. An adaptive continuous tracking (ACT) system for a satellite-based navigation receiver comprising:
    an ACT on/off control module configured to adjust an observation time of signals from a plurality of tracked satellites for at least one global navigation satellite system (GNSS) responsive to performance measurements, wherein the observation time is adjusted lower if the performance measurements are above minimum performance metrics, and the observation time is adjusted higher if the performance measurements fall below the minimum performance metrics;
    a RF front end module configured to adjust a duty cycle of an on/off period of the RF front end module responsive to the adjusted observation time to generate corresponding on-time samples from the plurality of tracked satellites; and
    a baseband processing module configured to adjust a duty cycle of an on/off period of the baseband processing module responsive to the adjusted observation time to process the on-time samples to generate range measurements to the plurality of tracked satellites.

2. The ACT system of claim 1, wherein the performance measurements comprise a measured dilution of precision (DOP), an error position estimate (EPE), a carrier-to-noise (CN0) estimate of each tracked satellite, a data demodulation status, and a number of tracked satellites.

3. The ACT system of claim 1, wherein the minimum performance metrics comprise a required DOP, a required EPE, a required CN0 of each tracked satellite, a requirement for data demodulation, and a minimum set of tracked satellites.

4. The ACT system of claim 1, wherein if the receiver observes signals from the plurality of tracked satellites for two GNSS's the ACT on/off control module is further configured to switch the RF front end module between the two GNSS's in a multiplexing cycle.

5. The ACT system of claim 1, wherein the RF front end module powers on/off parts of a receiving chain in a cycle corresponding to the duty cycle of the on/off period of the RF front end module.

6. The ACT system of claim 1, wherein the RF front end module operates in a coherent sub-mode wherein a carrier phase of a local oscillator is maintained across an off time of the on/off period of the RF front end module.

7. The ACT system of claim 6, wherein the on/off period of the RF front end module and the on/off period of the baseband processing module are a length of a data bit of the signals from the plurality of tracked satellites to allow the receiver to observe signals for each of the data bit so as to maintain data demodulation.

8. The ACT system of claim 6, wherein a navigation processor receives and processes the range measurements at a fixed rate regardless of the observation time.

9. The ACT system of claim 1, wherein the RF front end module operates in a non-coherent sub-mode wherein a carrier phase of a local oscillator is not maintained across an off time of the on/off period of the RF front end module.

10. The ACT system of claim 1, wherein the on/off period of the baseband processing module is synchronized with the on/off period of the RF front end module.

11. The ACT system of claim 1, wherein the baseband processing module enables/disables a coherent integration of a correlation between the on-time samples and a local replica of a PN (pseudorandom) code of a tracked satellite in a cycle corresponding to the duty cycle of the on/off period of the baseband processing module.

12. The ACT system of claim 11, wherein the baseband processing module propagates values of a carrier NCO (numerically controlled oscillators) and a code NCO across an off time of the on/off period of the baseband processing module.

13. The ACT system of claim 11, wherein the baseband processing module performs a correlation between samples of a signal of a tracked satellite and the local replica of the PN code of the tracked satellite wherein the samples are not the on-time samples.

14. A method for reducing power consumption of a satellite-based navigation receiver comprising:
    determining minimum performance metrics of the receiver;
    monitoring performance measurements of the receiver;
    adjusting periodically an observation time of signals from a plurality of tracked satellites for at least one global navigation satellite systems (GNSS) responsive to the performance measurements, wherein the observation time is adjusted lower if the performance measurements are above the minimum performance metrics, and the observation time is adjusted higher if the performance measurements fall below the minimum performance metrics;
    adjusting a duty cycle of an on/off period of the receiver responsive to the adjusted observation time to generate a navigation solution; and
    updating the performance measurements of the receiver.

15. The method of claim 14, wherein the performance measurements comprise a measured dilution of precision (DOP), an error position estimate (EPE), a carrier-to-noise (CN0) estimate of each tracked satellite, a data demodulation status, and a number of tracked satellites.

16. The method of claim 14, wherein the minimum performance metrics comprise a required DOP, a required EPE, a required CN0 of each tracked satellite, a requirement for data demodulation, and a minimum set of tracked satellites.

17. The method of claim 14, further comprising powering on/off parts of the receiver in a cycle corresponding to the duty cycle of the on/off period of the receiver.

18. The method of claim 14, further comprising maintaining a carrier phase of a local oscillator across an off time of the on/off period of the receiver.

19. The method of claim 18, wherein the on/off period is a length of a data bit of the signals from the plurality of tracked satellites to allow the receiver to observe signals for each of the data bit so as to maintain data demodulation.

20. The method of claim 14, further comprising not maintaining a carrier phase of a local oscillator across an off time of the on/off period of the receiver.

21. The method of claim 14, further comprising trading off a first observation time of signals from a first plurality of tracked satellites for a first GNSS against a second observation time of signals from a second plurality of tracked satellites for a second GNSS so as to meet the minimum performance metrics when the receiver observes signals for two or more GNSS's.

* * * * *